(12) United States Patent
Pan et al.

(10) Patent No.: US 12,422,834 B2
(45) Date of Patent: Sep. 23, 2025

(54) TASK-LEVEL COOPERATIVE OPTIMIZATION DISPATCHING METHOD SUPPORTING MULTI-CLOUD DISCONNECTION DISASTER RECOVERY

(71) Applicant: SHENYANG INSTITUTE OF AUTOMATION, CHINESE ACADEMY OF SCIENCES, Liaoning (CN)

(72) Inventors: Fucheng Pan, Liaoning (CN); Haibo Shi, Liaoning (CN); Guoliang Hu, Liaoning (CN); Xin Li, Liaoning (CN); Peng Li, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 18/858,777

(22) PCT Filed: Jan. 16, 2024

(86) PCT No.: PCT/CN2024/072423
§ 371 (c)(1),
(2) Date: Oct. 22, 2024

(87) PCT Pub. No.: WO2025/129782
PCT Pub. Date: Jun. 26, 2025

(65) Prior Publication Data
US 2025/0258486 A1  Aug. 14, 2025

(30) Foreign Application Priority Data
Dec. 20, 2023 (CN) .......................... 202311756761.5

(51) Int. Cl.
*G05B 19/418* (2006.01)

(52) U.S. Cl.
CPC ... *G05B 19/41885* (2013.01); *G05B 19/4185* (2013.01)

(58) Field of Classification Search
CPC ..................... G05B 19/41885; G05B 19/4185
(Continued)

(56) References Cited

U.S. PATENT DOCUMENTS

| 6,948,172 | B1* | 9/2005 | D'Souza | G06F 9/4881 |
| | | | | 718/107 |
| 2023/0050163 | A1* | 2/2023 | Hu | G06F 9/5077 |
| 2025/0192608 | A1* | 6/2025 | Chen | G06Q 10/06313 |

FOREIGN PATENT DOCUMENTS

| CN | 106507492 A | | 3/2017 | |
| CN | 109241365 A | * | 1/2019 | ............. G07C 13/00 |

(Continued)

*Primary Examiner* — Thomas C Lee
*Assistant Examiner* — Michael Tang
(74) *Attorney, Agent, or Firm* — NKL Law; Allen Xue

(57) ABSTRACT

A task-level cooperative optimization dispatching method supporting multi-cloud disconnection disaster recovery is provided. Since cooperative dispatching is required for different resource requirements in the abnormal stage of a network, a cooperative computing system is formed by nodes of a production shop, production tasks are transmitted and processed between the nodes according to technological requirements, and task-level cooperative optimization dispatching is conducted through a CoopDispatch method in case of disconnection to ensure continuous production. The CoopDispatch method has the characteristic of high dependence on specific resources for manufacturing tasks. Data transmission, storage and calculation are achieved through a LocalAny mechanism, which can reduce task delay, improve the cooperation efficiency among the tasks and satisfy the needs of manufacturing enterprises for disconnection disaster recovery in the multi-cloud mode.

3 Claims, 1 Drawing Sheet

(58) Field of Classification Search
USPC .......................................................... 700/108
See application file for complete search history.

(56) References Cited

FOREIGN PATENT DOCUMENTS

| | | | | |
|---|---|---|---|---|
| CN | 111199316 A | * | 5/2020 | ............. G06N 3/126 |
| CN | 112887140 A | | 6/2021 | |
| CN | 115473938 A | | 12/2022 | |
| CN | 116149276 A | * | 5/2023 | ....... G05B 19/41885 |

* cited by examiner

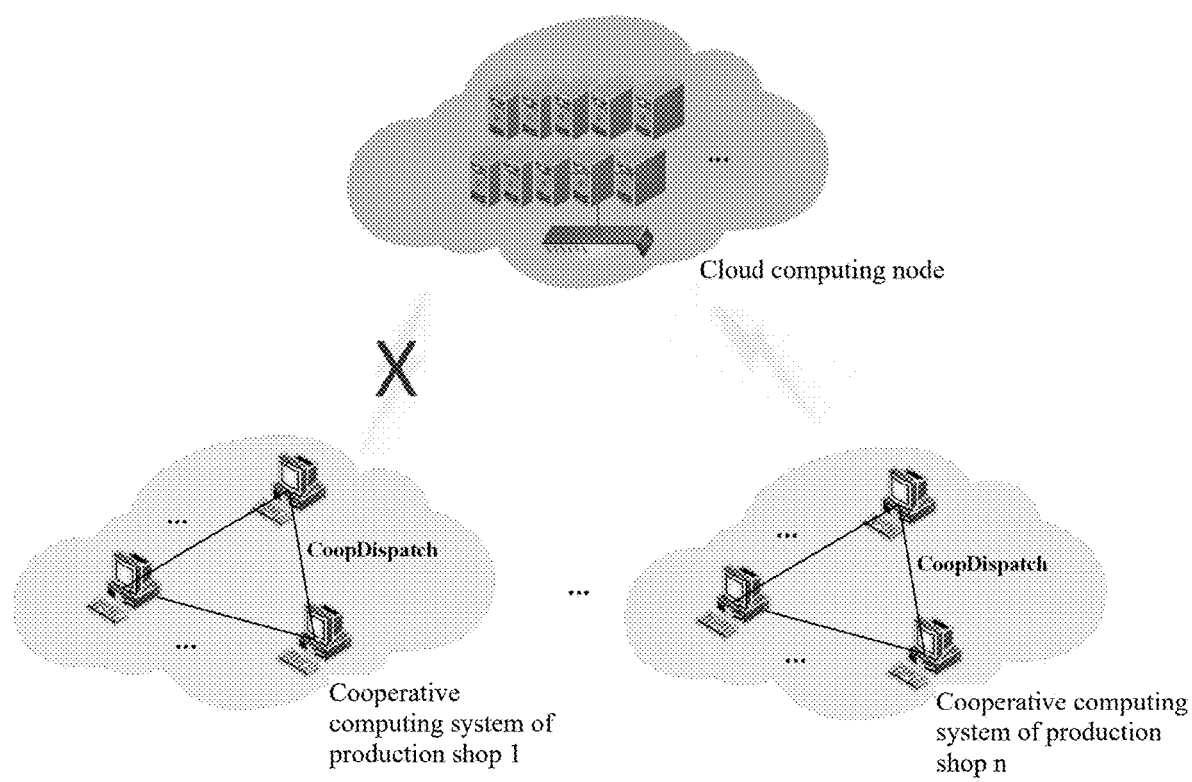

TASK-LEVEL COOPERATIVE OPTIMIZATION DISPATCHING METHOD SUPPORTING MULTI-CLOUD DISCONNECTION DISASTER RECOVERY

TECHNICAL FIELD

The present invention relates to the technical field of computer system information, in particular to a task-level cooperative optimization dispatching method supporting multi-cloud disconnection disaster recovery.

BACKGROUND

The rapid development of a new generation of information technology provides good technical support for the technology integration innovation of the manufacturing industry, and focuses on promoting the high-quality development of the manufacturing industry, strengthening the industrial foundation and technology innovation capacity, promoting the integrated development of the advanced manufacturing industry and modern service industry, accelerating the construction of a manufacturing power, creating an industrial Internet platform and expanding "intelligence plus" to enable the transformation and upgrading of the manufacturing industry to become the main development direction of the new round of industrial revolution. Under this background, the intelligent decision of enterprises needs a new application innovation carrier. With the transformation of the manufacturing industry and the integration of digital economy wave, the integration innovation of information technologies such as cloud computing, the Internet of things and big data with the manufacturing technology and industrial knowledge has continued to intensify, and an industrial Internet platform has emerged. Business cloudification of the enterprises has become a trend.

In the traditional manufacturing mode, the business system of the enterprise is operated locally, and may not be affected by the fault of a peripheral network. However, after cloudification of the business system of the enterprise, if the previous "resource-centered" mode of requesting at a client and response at a server is still used, the business system of the enterprise will be affected once a network of an enterprise end and a cloud fails. On the basis of the prior art, the present invention focuses on solving the problem of how to ensure the cooperative optimization of tasks due to the highly dependent characteristics of specific resources of a manufacturing task when a local area network of a production workshop is normal and a network among multiple clouds is disconnected under a multi-cloud mode, and fills the technical gap in this field.

SUMMARY

In view of the defects of the prior art, the present invention provides a task-level cooperative optimization dispatching method supporting multi-cloud disconnection disaster recovery. Considering that the "resource-centered" real-time request-response mode of the traditional production management and control system is not applicable to a multi-cloud environment and a large number of frequent data interactions are needed between manufacturing nodes in the production management and control system in the multi-cloud environment, the method of the present invention provides task-level cooperative optimization dispatching through a CoopDispatch method in case of disconnection to ensure continuous production, and achieves data transmission, storage and calculation through a LocalAny mechanism, which can reduce task delay, improve the cooperation efficiency among tasks and satisfy the needs of manufacturing enterprises for disconnection disaster recovery in the multi-cloud mode.

To realize the above purpose, the present invention adopts the technical solution: a task-level cooperative optimization dispatching method supporting multi-cloud disconnection disaster recovery comprises the following steps:

assigning, by a manufacturing node, a task to other matched manufacturing nodes through an end-to-end communication channel not dependent on a service;

conducting cooperative optimization dispatching for the task between the manufacturing node and other manufacturing nodes by a CoopDispatch method;

synchronizing task processing results of the manufacturing node and other manufacturing nodes among the manufacturing nodes by a LocalAny mechanism.

The manufacturing node is a client of an edge side for workshops of manufacturing enterprises to carry a production management and control system in a multi-cloud environment.

The multi-cloud comprises a cloud formed after cloudification of an enterprise management and control business and a sub-cloud of a production workshop of each manufacturing enterprise.

The CoopDispatch method calculates a resource-limited minimum task execution average time in a cooperative computing system composed of a plurality of manufacturing nodes to cooperatively dispatch the task to improve the overall revenue of the cooperative computing system, comprising the following steps:

1) dividing tasks in the cooperative computing system CS into class |M|; representing a task set as Task; for the tasks in class m, m∈|M|, and processing the tasks only in the task set Task$_m$∈ Task where resource $R_i$ exists; for the current manufacturing node, an arrival rate $A_i^m$(t) of a request for the tasks in class m to other manufacturing nodes at time t satisfies:

$$0 \leq A_i^m(t) \leq A_m^{max} * \tau_{\{T_i \in Task_m\}}$$

wherein $A_m^{max}$ represents a maximum arrival rate of the tasks in class m, i represents an ith task of the tasks in class m, $\tau_{\{T_i \in Task_m\}}$ is a flag bit for representing whether the task $T_i$ that can be processed by the resource $R_i$ is in the task set Task$_m$, i.e.:

$$\tau_{\{T_i \in Task_m\}} = \begin{cases} 1, \forall_i \in Task_m \\ 0, \forall_i \notin Task_m \end{cases}$$

the manufacturing node processes multiple tasks at the same time, the tasks in class m at time t are stored in a queue $Q_i^m(t)$, and all task queues $\{Q_i^m(t), r_i \in R_i, Task_m \in Task\}$ constitute the following queue matrix Q(t):

$$Q(T) = \begin{bmatrix} Q_1^1(t) & Q_1^2(t) & \dots & Q_1^{|M|}(t) \\ Q_2^1(t) & Q_2^2(t) & \dots & Q_2^{|M|}(t) \\ \dots & \dots & \dots & \dots \\ Q_I^1(t) & Q_I^2(t) & \dots & Q_I^{|M|}(t) \end{bmatrix}$$

$r_i$ represents a resource in resource set $R_i$, and $Q_I^{|M|}(t)$ represents a last task of the processed tasks in class m with a queue waiting number of |M|; $Q_i^m(t)$ represents a task in class m processed by the resource $r_i$, i=1 ... I;

the number of requests of the task in class m received at time t is defined $a_i^m(t)$, which satisfies:

$$0 \leq a_i^m(t) \leq A_i^m(t) * \Delta t$$

wherein $\Delta t$ represents a time interval, which is a constant; the task execution average time is as follows:

$$a_i^m = \lim_{t \to \infty} \frac{1}{t} \sum_{\tau=0}^{t=1} \alpha E\{a_i^m(\tau_{\{T_i \in Task_m\}})\}$$

wherein $\alpha$ is an empirical constant, E{ } represents an expectation, which indicates the expectation of the task execution average time $a_i^m$;

2) assigning, by the cooperative computing system CS, resources required by the tasks to process the tasks, and assigning the resource $CS_i$ corresponding to the ith task to the resource requested by the task in class m, $r_i^m(t)$.

$$\sum_m r_i^m(t) \leq R_i$$

updating a task processing queue by the manufacturing node through the following model:

$$Q_i^m(t+1) = \max(Q_i^m(t) - r_i^m(t) * \partial_m)$$

wherein $\partial_m$ represents the number of the tasks in class m that can be processed by unit resource in a set cycle;

3) constructing a comprehensive benefit model according to the task execution average time $a_i^m$ and the resource $r_i^m(t)$, and obtaining a combination of minimum execution average time $a_i^m$ and resource $r_i^m(t)$ by comprehensive benefit maximization of the collaborative computing system CS to achieve cooperative optimization dispatching.

In step 3), achieving cooperative optimization dispatching by comprehensive benefit maximization of the collaborative computing system CS comprises the following steps:

(1) when the task of the manufacturing node is received by other manufacturing nodes, the manufacturing node obtains the following benefits:

$$\int 1^{(a_i^m)} = \log(1 + \beta_m * a_i^m)$$

wherein $\int 1^{(a_i^m)}$ represents the first part of benefit, $\beta_m$ is a request revenue constant of the task in class m and $a_i^m$ is the task execution average time;

(2) the number $n_m(t)$ of requests of the task in class m processed by the manufacturing node at time t is:

$$n_m(t) = \sum_i r_i^m(t) * \partial_m$$

$\int_m$ represents the number of the tasks in class m that can be processed by unit resource in a set cycle; corresponding revenue is:

$$\int 2^{(n_m)} = \theta_m * n_m$$

wherein $n_m$ is a time expectation of $n_m(t)$, and $\theta_m$ is a corresponding revenue constant; $\int 2^{(n_m)}$ represents the second part of benefit, which depends on the number of served requests;

(3) the comprehensive benefit model is:

$$B = \sum_{i,m} \int 1^{(a_i^m)} + \sum_m \int 2^{(n_m)}$$

wherein i represents the ith as o the tasks in class m;

(4) to maximize the comprehensive benefit to achieve cooperative optimization, $a_i^m$ obtained is the minimum execution average time when B reaches a maximum value.

Synchronizing task processing results of the manufacturing node and other manufacturing nodes among the manufacturing nodes by a LocalAny mechanism comprises the following steps:

when the manufacturing node receives the tasks of other nodes, with the first part of benefit $\int 1^{(a_i^m)}$ being nonlinear, adding a transform constant variable $y_i^m(t)$ and a constant variable transposition queue $\{Y_i^m(t), \forall i, m\}$ to convert task optimization dispatching into a linear problem:

$$\Phi(\Omega(t)) = \sum_{i,m} E\{Q_i^m(t) * w_m * a_i^m(t) - Y_i^m(t) * \partial_m * a_i^m(t) | \Omega(t)\}$$

wherein $w_m$ and $\partial_m$ are constant variables, $\Phi(\Omega(t))$ represents a maximum comprehensive benefit value, $\Omega(t)$ represents a difference between a current comprehensive benefit and an average comprehensive benefit, E{ } represents an expectation which here represents an expected value of benefit, and $a_i^m$ is the task execution average time;

substituting the combination of the execution average time $a_i^m$ and the resource $r_i^m(t)$ obtained by comprehensive benefit maximization of the cooperative computing system CS in step 3) into $\Phi(\Omega(t))$, and minimizing $\Phi(\Omega(t))$ to obtain an optimized task dispatching strategy;

$$a_i^m(t) = \begin{cases} A_i^m(t), & Q_i^m(t) \leq Y_i^m(t) \\ 0, & \text{other} \end{cases}$$

when a real queue $Q_i^m(t)$ is not longer than the constant variable transposition queue, receiving, by the manufacturing node, all requests of the tasks in class m that reach at time t, otherwise waiting.

The present invention has the following beneficial effects and advantages:

1. The task-level cooperative optimization dispatching through the CoopDispatch method in case of disconnection in the method of the present invention can ensure continuous production.

2. The LocalAny mechanism is adopted by the present invention to achieve data transmission, storage and calculation, which can reduce task delay, improve the cooperation efficiency among tasks and satisfy the needs of manufacturing enterprises for disconnection disaster recovery in the multi-cloud mode.

DESCRIPTION OF DRAWINGS

The FIGURE is a schematic diagram of a method of the present invention.

DETAILED DESCRIPTION

The present invention will be further described in detail below in combination with the drawings and the embodiments.

The FIGURE is a schematic diagram of a method of the present invention.

The present invention relates to a task-level cooperative optimization dispatching method supporting multi-cloud disconnection disaster recovery. With the continuous development and popularization of the cloud computing technology, cloudification of the manufacturing enterprises has become a trend. After enterprise cloudification, when a local area network of a production workshop is normal and a network of the multi-cloud is disconnected, how to ensure normal and sustainable production has become a technical problem concerned in the industry. In view of the problem that cooperative dispatching is required for different resource requirements in the abnormal stage of a network, a cooperative computing system is formed by nodes of a production shop, production tasks are transmitted and processed between the nodes according to technological requirements, and task-level cooperative optimization dispatching is conducted through a CoopDispatch method in case of disconnection to ensure continuous production. The CoopDispatch method adopted by the present invention has the characteristic of high dependence on specific resources for manufacturing tasks. Data transmission, storage and calculation are achieved through a LocalAny mechanism, which can reduce task delay, improve the cooperation efficiency among the tasks and satisfy the needs of manufacturing enterprises for disconnection disaster recovery in the multi-cloud mode.

A task-level cooperative optimization dispatching method supporting multi-cloud disconnection disaster recovery comprises the following steps:

assigning, by a manufacturing node, a computing-intensive and resource-sensitive task to matched manufacturing nodes through an end-to-end communication channel not dependent on a service;

wherein computing-intensive means that computing resources required for processing the task are high, such as special resources of GPU resources and high computing power;

resource-sensitive means that processing of the task requires specific manufacturing resources, such as equipment with special production capacity or production lines with specific technologies according to the production technologies;

conducting cooperative optimization dispatching for the task among the manufacturing nodes by a CoopDispatch method;

synchronizing task processing results among the manufacturing nodes by a LocalAny mechanism.

The manufacturing node is a client of an edge side for workshops of manufacturing enterprises to carry a production management and control system in a multi-cloud environment.

The multi-cloud comprises a cloud formed after cloudification of an enterprise management and control business and a sub-cloud of a production workshop of each manufacturing enterprise.

The CoopDispatch method calculates a resource-limited minimum task execution average time in a cooperative computing system to cooperatively dispatch the task to improve the overall revenue of the system, comprising the following steps:

dividing tasks in the cooperative computing system CS into class |M|; representing a task set as Task; for the tasks in class m, m∈|M|, and processing the tasks only in the task set $Task_m \in Task$ where resource $R_i$ exists; for the current manufacturing node, an arrival rate $A_i^m(t)$ of a request for the tasks in class m to other manufacturing nodes at time t satisfies:

$$0 \leq A_i^m(t) \leq A_m^{max} * \tau_{\{T_i \in Task_m\}}$$

wherein $A_m^{max}$ represents a maximum arrival rate of the tasks in class m, i represents an ith task of the tasks in class m, $\tau_{\{T_i \in Task_m\}}$ is a flag bit for representing whether the task $T_i$ that can be processed by the resource $R_i$ is in the task set $Task_m$, i.e.:

$$\tau_{\{T_i \in Task_m\}} = \begin{cases} 1, \forall_i \in Task_m \\ 0, \forall_i \notin Task_m \end{cases}$$

the manufacturing node processes multiple tasks at the same time, the tasks in class m at time t are stored in a queue $Q_i^m(t)$, and all task queues $\{Q_i^m(t), r_i \in R_i, Task_m \in Task\}$ constitute the following queue matrix Q(t):

$$Q(t) = \begin{bmatrix} Q_1^1(t) & Q_1^2(t) & \ldots & Q_1^{|M|}(t) \\ Q_2^1(t) & Q_2^2(t) & \ldots & Q_2^{|M|}(t) \\ \ldots & \ldots & \ldots & \ldots \\ Q_I^1(t) & Q_I^2(t) & \ldots & Q_I^{|M|}(t) \end{bmatrix}$$

$r_i$ represents a resource in resource set $R_i$, and $Q_I^{|M|}(t)$ represents a last task of the processed tasks in class m with a queue waiting number of |M|; $Q_i^m(t)$ represents a queue of tasks in class m processed by the resource $r_i$, i=1 . . . I;

the number of requests of the task in class m received at time t is defined as $a_i^m(t)$, which satisfies:

$$0 \leq a_i^m(t) \leq A_i^m(t) * \Delta t$$

wherein Δt represents a time interval, which is a constant; the task execution average time is as follows:

$$a_i^m = \lim_{t \to \infty} \frac{1}{t} \sum_{\tau=0}^{t-1} \alpha E\{a_i^m(\tau_{\{T_i \in Task_m\}})\}$$

wherein α is an empirical constant, and E represents an expectation of the task execution average time $a_i^m$;

assigning, by the cooperative computing system CS, resources required by the tasks to process the tasks, and assigning the resource $CS_1$ corresponding to the ith task to the resource requested by the task in class m, $r_i^m(t)$:

$$\sum_m r_i^m(t) \leq R_i$$

updating a task processing queue by the manufacturing node through the following model:

$$Q_i^m(t+1)=\max(Q_i^m(t)-r_i^m(t)*\partial_m)$$

wherein $\partial_m$ represents the number of the tasks in class m that can be processed by unit resource in a certain cycle;

constructing a comprehensive benefit model according to the task execution average time $a_i^m$ and the resource $r_i^m(t)$, and obtaining a combination of minimum execution average time $a_i^m$ and resource $r_i^m(t)$ by comprehensive benefit maximization of the collaborative computing system CS to achieve cooperative optimization dispatching.

Finally, the comprehensive benefit maximization of the collaborative computing system CS is computed to achieve the purpose of cooperative optimization. The benefits here can be divided into two parts:

When the task of the manufacturing node is received by other manufacturing nodes, the manufacturing node obtains the following benefits:

$$\int 1^{(a_i^m)}=\log(1+\beta_m*a_i^m)$$

wherein $\int 1^{(a_i^m)}$ represents the first part of benefit, $\beta_m$ is a request revenue constant of the task in class m and $a_i^m$ is the task execution average time;

the number $n_m(t)$ of requests of the task in class m processed by the manufacturing node at time t is:

$$n_m(t) = \sum_i r_i^m(t)*\partial_m$$

corresponding revenue is:

$$\int 2^{(n_m)}=\theta_m*n_m$$

wherein $n_m$ is a time expectation of $n_m(t)$, and $\theta_m$ is a corresponding revenue constant; $\int 2^{(n_m)}$ represents the second part of benefit, which depends on the number of served requests; the comprehensive benefit model is:

$$B = \sum_{i,m} \int 1^{(a_i^m)} + \sum_m \int 2^{(n_m)}$$

wherein i represents the ith task of the tasks in class m; to maximize the comprehensive benefit to achieve cooperative optimization, $a_i^m$ obtained is the minimum execution average time when B reaches a maximum value.

When the manufacturing node receives the tasks of other nodes, with the first part of benefit $\int 1^{(a_i^m)}$ being nonlinear, adding a transform constant variable $y_i^m(t)$ and a constant variable transposition queue $\{Y_i^m(t), \forall i, m\}$ to convert task optimization dispatching into a linear problem:

$$\Phi(\Omega(t)) = \sum_{i,m} E\{Q_i^m(t)*w_m*a_i^m(t) - Y_i^m(t)*\partial_m*a_i^m(t) | \Omega(t)\}$$

wherein $w_m$ and $\partial_m$ are constant variables, $\Phi(\Omega(t))$ represents a maximum comprehensive benefit value, $\Omega(t)$ represents a difference between a current comprehensive benefit and an average comprehensive benefit, E represents an expected value of benefit, and $a_i^m$ is the task execution average time;

The combination of the execution average time $a_i^m$ and the resource $r_i^m(t)$ obtained by comprehensive benefit maximization of the cooperative computing system CS is substituted into $\Phi(\Omega(t))$, and $\Phi(\Omega(t))$ is minimized to obtain an optimized task dispatching strategy:

$$a_i^m(t) = \begin{cases} A_i^m(t), & Q_i^m(t) \le Y_i^m(t) \\ 0, & \text{other} \end{cases}$$

when a real queue $Q_i^m(t)$ is not longer than the constant variable transposition queue, receiving, by the manufacturing node, all requests of the tasks in class m that reach at time t, otherwise waiting.

The invention claimed is:

1. A task-level cooperative optimization dispatching method supporting multi-cloud disconnection disaster recovery, comprising the following steps:

assigning, by a manufacturing node, a task to other matched manufacturing nodes through an end-to-end communication channel not dependent on a service;

conducting cooperative optimization dispatching for the task between the manufacturing node and other manufacturing nodes by a cooperative dispatch method;

synchronizing task processing results of the manufacturing node and other manufacturing nodes among the manufacturing nodes by a locality mechanism, wherein the cooperative dispatch method calculates a resource-limited minimum task execution average time in a cooperative computing system composed of a plurality of manufacturing nodes to cooperatively dispatch the task to improve the overall revenue of the cooperative computing system, comprising the following steps:

1) dividing tasks in the cooperative computing system CS into class |M|; representing a task set as Task; for the tasks in class m, m∈ |M|, and processing the tasks only in the task set Task$_m$∈ Task where resource $R_i$ exists; for the current manufacturing node, an arrival rate $A_i^m(t)$ of a request for the tasks in class m to other manufacturing nodes at time t satisfies:

$$0 \le A_i^m(t) \le A_m^{max}*\tau_{\{T_i \in Task_m\}}$$

wherein $A_m^{max}$ represents a maximum arrival rate of the tasks in class m, i represents an ith task of the tasks in class m, $\tau_{\{T_i \in Task_m\}}$ is a flag bit for representing whether the task $T_i$ that can be processed by the resource $R_i$ is in the task set Task$_m$, wherein:

$$\tau_{\{T_i \in Task_m\}} = \begin{cases} 1, & \forall_i \in Task_m \\ 0, & \forall_i \notin Task_m \end{cases}$$

the manufacturing node processes multiple tasks at the same time, the tasks in class m at time t are stored in a queue $Q_i^m(t)$, and all task queues $\{Q_i^m(t), r_i \in R_i, Task_m \in Task\}$ constitute the following queue matrix Q(t):

$$Q(t) = \begin{bmatrix} Q_1^1(t) & Q_1^2(t) & \ldots & Q_1^{|M|}(t) \\ Q_2^1(t) & Q_2^2(t) & \ldots & Q_2^{|M|}(t) \\ \ldots & \ldots & \ldots & \ldots \\ Q_i^1(t) & Q_i^2(t) & \ldots & Q_i^{|M|}(t) \end{bmatrix}$$

$r_i$ represents a resource in resource set $R_i$, and $Q_I^{|M|}(t)$ represents a last task of the processed tasks in class m with a queue waiting number of $|M|$; $Q_i^m(t)$ represents a task in class m processed by the resource $r_i$, i=1 ... I;

the number of requests of the task in class m received at time t is defined as $a_i^m(t)$, which satisfies:

$$0 \leq a_i^m(t) \leq A_i^m(t)*\Delta t,$$

wherein $\Delta t$ represents a time interval, which is a constant; the task execution average time is as follows:

$$a_i^m = \lim_{t \to \infty} \frac{1}{t} \sum_{\tau=0}^{t-1} \alpha E\{a_i^m(\tau_{\{T_i \in Task_m\}})\},$$

wherein $\alpha$ is an empirical constant, $E\{\ \}$ represents an expectation, which indicates the expectation of the task execution average time $a_i^m$;

2) assigning, by the cooperative computing system CS, resources required by the tasks to process the tasks, and assigning the resource $CS_i$ corresponding to the ith task to the resource requested by the task in class m, $r_i^m(t)$:

$$\Sigma_m r_i^m(t) \leq R_i,$$

updating a task processing queue by the manufacturing node through the following model:

$$Q_i^m(t+1) = \max(Q_i^m(t) - r_i^m(t)*\partial m),$$

wherein $\partial_m$ represents the number of the tasks in class m that can be processed by unit resource in a set cycle;

3) constructing a comprehensive benefit model according to the task execution average time $a_i^m$ and the resource $r_i^m(t)$, and obtaining a combination of minimum execution average time $a_i^m$ and resource $r_i^m(t)$ by comprehensive benefit maximization of the collaborative computing system CS to achieve cooperative optimization dispatching, wherein:

in step 3), achieving cooperative optimization dispatching by comprehensive benefit maximization of the collaborative computing system CS comprises the following steps:

(1) when the task of the manufacturing node is received by other manufacturing nodes, the manufacturing node obtains the following benefits:

$$\int 1^{(a_i^m)} = \log(1 + \beta_m * a_i^m),$$

wherein $\int 1^{(a_i^m)}$ represents the first part of benefit, $\beta_m$ is a request revenue constant of the task in class m and $a_i^m$ is the task execution average time;

(2) the number $n_m(t)$ of requests of the task in class m processed by the manufacturing node at time t is:

$$n_m(t) = \Sigma_i r_i^m(t) * \partial_m,$$

$\partial_m$ represents the number of the tasks in class m that can be processed by unit resource in a set cycle; corresponding revenue is:

$$\int 2^{(n_m)} = \theta_m * n_m,$$

wherein $n_m$ is a time expectation of $n_m(t)$, and $\theta_m$ is a corresponding revenue constant; $\int 2^{(n_m)}$ represents the second part of benefit, which depends on the number of served requests;

(3) the comprehensive benefit model is:

$$B = \Sigma_{i,m} \int 1^{(a_i^m)} + \Sigma_m \int 2^{(n_m)},$$

wherein i represents the ith task of the tasks in class m; and (4) to maximize the comprehensive benefit to achieve cooperative optimization, $a_i^m$ obtained is the minimum execution average time when B reaches a maximum value, wherein:

synchronizing task processing results of the manufacturing node and other manufacturing nodes among the manufacturing nodes by the locality mechanism comprises the following steps:

when the manufacturing node receives the tasks of other nodes, with the first part of benefit $\int 1^{(a_i^m)}$ being nonlinear, adding a transform constant variable $y_i^m(t)$ and a constant variable transposition queue $\{Y_i^m(t), \forall i, m\}$ to convert task optimization dispatching into a linear problem:

$$\Phi(\Omega(t)) = \Sigma_{i,m} E\{Q_i^m(t)*w_m*a_i^m(t) - Y_i^m(t)*\partial_m*a_i^m(t)|(\Omega(t))\},$$

wherein $w_m$ and $\partial_m$ are constant variables, $\Phi(\Omega(t))$ represents a maximum comprehensive benefit value, $\Omega(t)$ represents a difference between a current comprehensive benefit and an average comprehensive benefit, $E\{\ \}$ represents an expectation which here represents an expected value of benefit, and $a_i^m$ is the task execution average time;

substituting the combination of the execution average time $a_i^m$ and the resource $r_i^m(t)$ obtained by comprehensive benefit maximization of the cooperative computing system CS in step 3) into $\Phi(\Omega(t))$, and minimizing $\Phi(\Omega(t))$ to obtain an optimized task dispatching strategy;

wherein $$a_i^m(t) = \begin{cases} A_i^m(t), & Q_i^m(t) \leq Y_i^m(t) \\ 0, & \text{other} \end{cases},$$

when a real queue $Q_i^m(t)$ is not longer than the constant variable transposition queue, receiving, by the manufacturing node, all requests of the tasks in class m that reach at time t and executing the requested tasks, otherwise, waiting.

2. The task-level cooperative optimization dispatching method supporting multi-cloud disconnection disaster recovery according to claim 1, wherein the manufacturing node is a client of an edge side for workshops of manufacturing enterprises to carry a production management and control system in a multi-cloud environment.

3. The task-level cooperative optimization dispatching method supporting multi-cloud disconnection disaster recovery according to claim 1, wherein the multi-cloud comprises a cloud formed after cloudification of an enterprise management and control business and a sub-cloud of a production workshop of each manufacturing enterprise.

* * * * *